(12) United States Patent
Long et al.

(10) Patent No.: US 10,929,561 B2
(45) Date of Patent: Feb. 23, 2021

(54) REMOVING PERSONALLY IDENTIFIABLE DATA BEFORE TRANSMISSION FROM A DEVICE

(71) Applicant: Microsoft Technology Licensing, LLC, Redmond, WA (US)

(72) Inventors: Donna K. Long, Redmond, WA (US); John B. Hesketh, Kirkland, WA (US); LaSean T. Smith, Bellevue, WA (US); Kenneth L. Kiemele, Redmond, WA (US); Evan L. Jones, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 209 days.

(21) Appl. No.: 15/907,203

(22) Filed: Feb. 27, 2018

(65) Prior Publication Data

US 2019/0138748 A1    May 9, 2019

Related U.S. Application Data

(60) Provisional application No. 62/582,262, filed on Nov. 6, 2017.

(51) Int. Cl.
*H04L 29/06* (2006.01)
*G06F 21/62* (2013.01)
(Continued)

(52) U.S. Cl.
CPC ..... *G06F 21/6254* (2013.01); *G06K 9/00228* (2013.01); *H04N 7/18* (2013.01);
(Continued)

(58) Field of Classification Search
CPC . G06F 21/6254; G06F 21/6245; H04N 7/183; H04N 7/18; G06K 9/00228; G06K 9/00778
See application file for complete search history.

(56) References Cited

U.S. PATENT DOCUMENTS 5,699,449 A * 12/1997 Javidi ................ G06K 9/00221
382/156
5,771,307 A *  6/1998 Lu ...................... G06K 9/00221
382/103
(Continued)

FOREIGN PATENT DOCUMENTS

WO      2016114392 A1     7/2016

OTHER PUBLICATIONS

L. Du, M. Yi, E. Blasch and H. Ling, "GARP-face: Balancing privacy protection and utility preservation in face de-identification," IEEE International Joint Conference on Biometrics, Clearwater, FL, 2014, pp. 1-8.*

(Continued)

*Primary Examiner* — David Garcia Cervetti

(57) ABSTRACT

A device for removal of personally identifiable data receives monitoring data acquired by a sensor. The monitoring data including personally identifiable data relating to one or more individuals being monitored. The system processes the acquired monitoring data to remove the personally identifiable data by at least one of abstraction or redaction while the monitoring data is located on the device. The processed monitoring data having the personally identifiable data removed can thereby be transmitted external to the device with reduced security risk.

20 Claims, 7 Drawing Sheets

(51) Int. Cl.
*H04N 7/18* (2006.01)
*G06K 9/00* (2006.01)

(52) U.S. Cl.
CPC ......... *H04N 7/183* (2013.01); *G06F 21/6245* (2013.01); *G06K 9/00778* (2013.01)

(56) References Cited

U.S. PATENT DOCUMENTS

| | | | | |
|---|---|---|---|---|
| 7,970,946 B1* | 6/2011 | Djabarov | ............ | G06F 11/3495 709/248 |
| 8,768,867 B1* | 7/2014 | Thaeler | ............ | G06Q 30/02 706/12 |
| 8,949,462 B1* | 2/2015 | Djabarov | ............ | H04L 63/0421 709/246 |
| 8,965,170 B1* | 2/2015 | Benea | ............ | G06K 9/00268 386/224 |
| 8,997,076 B1* | 3/2015 | Djabarov | ............ | G06F 21/10 717/168 |
| 9,122,859 B1* | 9/2015 | Djabarov | ............ | G06F 8/65 |
| 9,219,790 B1* | 12/2015 | Filev | ............ | H04N 21/25866 |
| 9,641,676 B1* | 5/2017 | Mandic | ............ | H04M 3/42221 |
| 9,881,178 B1* | 1/2018 | Brown | ............ | H04M 3/5183 |
| 10,034,049 B1* | 7/2018 | Deephanphongs | .... | H04H 60/45 |
| 10,390,220 B2* | 8/2019 | Joy | ............ | H04W 12/02 |
| 10,420,701 B2* | 9/2019 | Freeman | ............ | G06K 9/00228 |
| 10,541,999 B1* | 1/2020 | Rosenberg | ............ | H04L 63/08 |
| 2001/0031073 A1* | 10/2001 | Tajima | ............ | G06K 9/00288 382/118 |
| 2003/0185424 A1* | 10/2003 | Sato | ............ | G06K 9/00255 382/118 |
| 2004/0081338 A1* | 4/2004 | Takenaka | ............ | G08B 13/1961 382/118 |
| 2004/0202382 A1* | 10/2004 | Pilu | ............ | H04N 5/23206 382/276 |
| 2006/0056670 A1* | 3/2006 | Hamadeh | ............ | G06T 7/0002 382/128 |
| 2006/0059148 A1* | 3/2006 | Dunki | ............ | G06F 11/3672 |
| 2006/0059149 A1* | 3/2006 | Dunki | ............ | G06F 11/3672 |
| 2006/0059189 A1* | 3/2006 | Dunki | ............ | G06F 11/3672 |
| 2007/0130460 A1* | 6/2007 | Pfitzmann | ............ | H04L 63/0815 713/168 |
| 2007/0153091 A1* | 7/2007 | Watlington | ............ | H04N 21/233 348/208.14 |
| 2007/0266079 A1* | 11/2007 | Criddle | ............ | G06Q 10/107 709/203 |
| 2008/0180459 A1* | 7/2008 | Jung | ............ | H04N 5/232 345/647 |
| 2008/0180539 A1* | 7/2008 | Jung | ............ | H04N 5/23219 348/222.1 |
| 2008/0181533 A1* | 7/2008 | Jung | ............ | G06K 9/3241 382/283 |
| 2009/0140838 A1* | 6/2009 | Newman | ............ | G06Q 20/40145 340/5.83 |
| 2009/0150444 A1* | 6/2009 | Cohen | ............ | G11B 27/28 |
| 2009/0151008 A1* | 6/2009 | Cohen | ............ | G11B 27/036 726/30 |
| 2009/0245578 A1* | 10/2009 | Yano | ............ | G06K 9/6227 382/103 |
| 2009/0276416 A1* | 11/2009 | Ball | ............ | G06F 16/2462 |
| 2009/0300480 A1* | 12/2009 | Cohen | ............ | G11B 27/036 715/234 |
| 2009/0316021 A1* | 12/2009 | Nozaki | ............ | H04N 5/772 348/231.2 |
| 2010/0017885 A1* | 1/2010 | Cohen | ............ | H04N 21/4627 726/26 |
| 2010/0154065 A1* | 6/2010 | Cohen | ............ | G11B 27/28 726/28 |
| 2011/0150327 A1* | 6/2011 | Yoo | ............ | G06T 1/00 382/165 |
| 2011/0302273 A1* | 12/2011 | Pfitzmann | ............ | G06F 21/41 709/217 |
| 2012/0090000 A1* | 4/2012 | Cohen | ............ | G11B 27/034 725/32 |
| 2012/0177248 A1* | 7/2012 | Shuster | ............ | H04W 12/02 382/100 |
| 2012/0288165 A1* | 11/2012 | Bedros | ............ | G06K 9/00221 382/118 |
| 2013/0060579 A1* | 3/2013 | Yu | ............ | G06Q 10/10 705/3 |
| 2013/0208955 A1* | 8/2013 | Zhao | ............ | G06Q 50/22 382/128 |
| 2013/0208966 A1* | 8/2013 | Zhao | ............ | G06F 19/321 382/131 |
| 2013/0227225 A1* | 8/2013 | Oliver | ............ | G06F 21/316 711/154 |
| 2013/0259299 A1* | 10/2013 | Srinivasan | ............ | G06K 9/00778 382/103 |
| 2014/0161316 A1* | 6/2014 | Golan | ............ | G06K 9/00261 382/103 |
| 2014/0218544 A1* | 8/2014 | Senot | ............ | H04N 21/2187 348/207.1 |
| 2014/0226855 A1* | 8/2014 | Savvides | ............ | G06K 9/00771 382/103 |
| 2014/0237618 A1* | 8/2014 | Vernal | ............ | G06F 21/6245 726/26 |
| 2014/0258906 A1* | 9/2014 | Kim | ............ | G06F 3/0484 715/771 |
| 2014/0327727 A1* | 11/2014 | Dong | ............ | H04N 5/265 348/14.07 |
| 2014/0327780 A1* | 11/2014 | Herrli Anderegg | ............ | G08B 13/19645 348/159 |
| 2014/0342331 A1* | 11/2014 | Freeman | ............ | H04N 5/2253 434/265 |
| 2014/0344017 A1* | 11/2014 | Deephanphongs | ............ | G06Q 30/0201 705/7.29 |
| 2015/0058957 A1* | 2/2015 | Halliday | ............ | H04W 12/06 726/7 |
| 2015/0106947 A1* | 4/2015 | Holman | ............ | G06F 21/62 726/26 |
| 2015/0213305 A1* | 7/2015 | Sundstrom | ............ | G06F 16/00 382/118 |
| 2015/0339519 A1 | 11/2015 | Ueta et al. | | |
| 2015/0363280 A1* | 12/2015 | Yeager | ............ | A61B 5/002 711/103 |
| 2016/0012182 A1* | 1/2016 | Golay | ............ | G16H 40/20 705/3 |
| 2016/0034717 A1* | 2/2016 | Keohane | ............ | H04W 12/0808 726/1 |
| 2016/0104035 A1* | 4/2016 | Wang | ............ | H04N 21/4318 382/118 |
| 2016/0132719 A1* | 5/2016 | Fithian | ............ | G06F 16/5866 345/647 |
| 2016/0155465 A1* | 6/2016 | Park | ............ | G11B 20/005 386/241 |
| 2016/0221687 A1* | 8/2016 | Boigas | ............ | B64D 47/08 |
| 2016/0224805 A1* | 8/2016 | Patti | ............ | G16H 10/60 |
| 2016/0224843 A1* | 8/2016 | Boigas | ............ | G06K 9/00255 |
| 2016/0292494 A1* | 10/2016 | Ganong | ............ | G06Q 30/0277 |
| 2016/0314576 A1* | 10/2016 | Aliverti | ............ | G06T 7/60 |
| 2016/0335552 A1 | 11/2016 | Longo et al. | | |
| 2016/0342738 A1* | 11/2016 | Stalling | ............ | G16H 15/00 |
| 2016/0358027 A1* | 12/2016 | Hotta | ............ | G06K 9/00785 |
| 2017/0004602 A1* | 1/2017 | Le Jouan | ............ | G06F 16/51 |
| 2017/0032084 A1* | 2/2017 | Stalling | ............ | G06F 21/6254 |
| 2017/0068863 A1* | 3/2017 | Rattner | ............ | G06K 9/00838 |
| 2017/0094019 A1* | 3/2017 | Ahmed | ............ | G06Q 50/01 |
| 2017/0112439 A1* | 4/2017 | Dubin | ............ | A61B 7/04 |
| 2017/0187994 A1* | 6/2017 | Tatourian | ............ | H04N 7/181 |
| 2017/0236096 A1* | 8/2017 | Tvaroh | ............ | G06F 3/0484 705/32 |
| 2017/0331887 A1* | 11/2017 | Fishler | ............ | H04L 63/0428 |
| 2017/0336635 A1* | 11/2017 | Yoon | ............ | H04N 21/4223 |
| 2017/0353855 A1* | 12/2017 | Joy | ............ | H04W 12/02 |
| 2018/0025175 A1 | 1/2018 | Kato | | |
| 2018/0122506 A1* | 5/2018 | Grantcharov | ............ | G06F 17/40 |
| 2018/0181796 A1* | 6/2018 | Wang | ............ | G06K 9/36 |
| 2018/0184240 A1* | 6/2018 | Yang | ............ | G06Q 30/0629 |
| 2018/0205550 A1* | 7/2018 | Appleyard | ............ | G09C 5/00 |

(56) References Cited

U.S. PATENT DOCUMENTS

| | | | | |
|---|---|---|---|---|
| 2018/0234665 | A1* | 8/2018 | Shim | H04N 7/18 |
| 2018/0265333 | A1* | 9/2018 | Schuster | B66B 13/26 |
| 2018/0278462 | A1* | 9/2018 | Bjontegard | A63F 13/79 |
| 2018/0285921 | A1* | 10/2018 | Levine | G06Q 30/0242 |
| 2018/0362296 | A1* | 12/2018 | Friedli | B66B 1/30 |
| 2019/0043354 | A1* | 2/2019 | Oluwafemi | H04L 67/12 |
| 2019/0051127 | A1* | 2/2019 | Kanga | G08B 13/19658 |
| 2019/0066832 | A1* | 2/2019 | Kang | A61B 5/4884 |
| 2019/0088351 | A1* | 3/2019 | Takarada | G01N 15/0656 |
| 2019/0103174 | A1* | 4/2019 | Power | G16H 10/60 |
| 2019/0115111 | A1* | 4/2019 | Mesidor | G16H 80/00 |
| 2019/0116290 | A1* | 4/2019 | Edi | G06T 3/0093 |
| 2019/0147584 | A1* | 5/2019 | Onoro-Rubio | G06N 3/0481 |
| | | | | 382/100 |
| 2019/0220697 | A1* | 7/2019 | Kiemele | G06K 9/00771 |
| 2019/0362536 | A1* | 11/2019 | Kuhn | G06T 15/00 |

OTHER PUBLICATIONS

Chan, et al., "Privacy Preserving Crowd Monitoring: Counting People Without people Models or Tracking", In Proceedings of the 2008 IEEE Conference on Computer Vision and Pattern Recognition, Jun. 23, 2008, 7 Pages.

"International Search Report and Written Opinion Issued in PCT Application No. PCT/US2018/058065", dated Jan. 24, 2019, 14 Pages.

* cited by examiner

REMOVING PERSONALLY IDENTIFIABLE DATA BEFORE TRANSMISSION FROM A DEVICE

CROSS-REFERENCE TO RELATED APPLICATION

This nonprovisional application claims the benefit of and priority to U.S. Provisional Application No. 62/582,262, filed Nov. 6, 2017, which is incorporated by reference herein in its entirety.

BACKGROUND

Many types of devices are capable of capturing data that can be used in various analytics. For example, Internet of Things (IoT) devices can collect different types of data, such as images of individuals or other personally identifiable data. The IoT allows IoT devices to connect and exchange this data, which then can be used to perform different kinds of analytics (e.g., spatial analytics on aggregated data).

The collection and transmission of the personally identifiable data can present a security risk. For example, the storage and/or transmission of certain personally identifiable data without adequate protections can result in legal or compliance requirement issues. In some instances, such data should not be collected and transmitted, such as when permission for collection and transmission of that personally identifiable data is needed, but not obtained (e.g., when an individual does not opt into or agree to the collection and transmission of that data).

Moreover, while safeguards may be used to reduce the security risks in some settings, such as applying encryption when transmitting the personally identifiable data, this adds complexity and processing overhead to the transmission of the data. Additionally, similar safeguards are often needed when storing the personally identifiable data, as well as having to store the data for longer periods of time, thereby adding cost and increasing the amount of data storage needed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for removal of personally identifiable data from a device comprises receiving acquired data that includes personally identifiable data and processing the acquired data locally at a device to remove the personally identifiable data from the monitoring data while the monitoring data is located on the device. The computerized method further comprises transmitting the processed monitoring data external to the device, the processed monitoring data having the personally identifiable data removed.

Many of the attendant features will be more readily appreciated as the same becomes better understood by reference to the following detailed description considered in connection with the accompanying drawings.

BRIEF DESCRIPTION OF THE DRAWINGS

The present description will be better understood from the following detailed description read in light of the accompanying drawings, wherein.

Corresponding reference characters indicate corresponding parts throughout the drawings. In the figures, the systems are illustrated as schematic drawings. The drawings may not be to scale.

DETAILED DESCRIPTION

Figure 1:
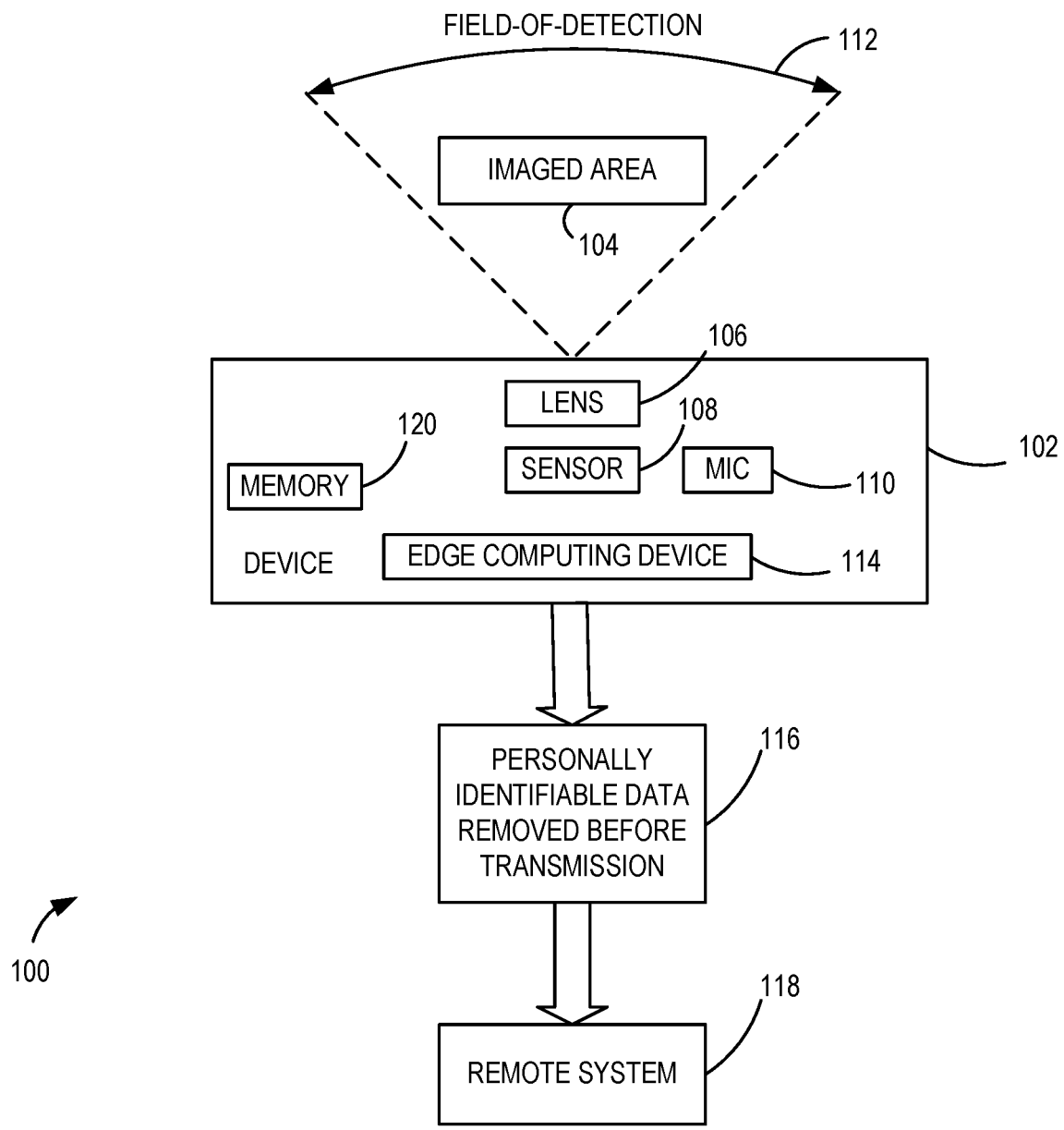
FIG. 1 is an exemplary block diagram illustrating use of a system configured for removing personally identifiable data stored on a device according to an embodiment.

The computing devices and methods described herein are configured to remove personally identifiable data acquired by a device, such that the personally identifiable data is not transmitted from the device (and not permanently stored in the device in some examples). For example, in an IoT device that communicates with other IoT devices or data collection and/or processing systems that store and/or process data in a data storage cloud or server remote from the IoT devices, personally identifiable data is removed before transmission of that data from the IoT device. This results in mitigating the security risk of transmitting the personally identifiable data.

The removal of the personally identifiable data includes abstracting or redacting the data before the data is communicated from the device. A security risk to the personally identifiable data is thereby improved with the personally identifiable data removal control described herein, and less storage for data is needed in various examples. The control of the type of data that is transmitted ensures that the personally identifiable data remains only within the device (e.g., images are stored on an IoT device and modified to remove the personally identifiable data before being transmitted). Edge computing is employed in some aspects of the present disclosure to process the data on the device and send only higher-level insights or anonymized data to the cloud or other system remote from the transmitting device.

By maintaining personally identifiable data on the device, such as the IoT device, the inherent problems with sending personally identifiable data over a network are reduced or eliminated. Thus, the personally identifiable data is safeguarded by avoiding the transmission of the personally identifiable data outside of the device, which simplifies development and deployment of applications that control the device, thereby improving the functioning of the device.

In various examples, IoT devices include objects or things with software, firmware, and/or hardware to allow communication with other devices. The IoT devices can perform different operations and can have different functionality.

This detailed description in connection with the appended drawings is intended as a description of a number of embodiments and is not intended to represent the only forms in which the embodiments may be constructed, implemented, or utilized. Although the embodiments may be described and illustrated herein as being implemented in devices such as an IoT camera device that acquires images or audio that include personally identifiable data (e.g., an image of a face of a person or audio of the person speaking), this is only an exemplary implementation. That is, the present disclosure can be implemented with different types of devices that acquire personally identifiable information. Additionally, while the embodiments may be described and illustrated for use in a particular application, other applications are contemplated by the present disclosure. Also, as those skilled in the art will appreciate, the present embodiments are suitable for application in a variety of different types of computing devices, for example, PCs, servers, laptop computers, tablet computers, mobile phones, vehicles, wearable devices, head-mounted devices, etc.

FIG. 1 is an exemplary block diagram illustrating use of a system 100 for capturing data, particularly of a surrounding area, including data relating to objects (e.g., individuals) within that surrounding area. In one example, a device 102 (e.g., a camera with image and audio recording capabilities) acquires a plurality of images of an imaged area 104 using a lens 106 and a sensor 108 (e.g., a charge-coupled device (CCD) or a complementary metal-oxide-semiconductor (CMOS) active pixel sensor) of the device 102. The imaged area 104 includes different types of objects, including individuals and other objects, in some examples. It should be appreciated that the sensor 108 can be any type of sensing device capable of acquiring data (including image data, as well as non-image data), which includes at least some personally identifiable data.

The device 102 optionally includes a microphone 110 configured to acquire audio in an area surrounding the device 102, such as within the imaged area 104. For example, the microphone captures and records voices of individuals imaged within the imaged area 104. In general, the device 102 acquires data within a field-of-detection 112, which includes images (e.g., still image or video) and audio, and which includes personally identifiable data in some examples, such as information allowing recognition of an individual recorded within the imaged area 104. It should be appreciated that other types of data can be acquired relating to the individuals within the field-of-detection 112, such as location information (e.g., Global Positioning System (GPS) information).

The device 102 is any type of device capable of acquiring data that includes personally identifiable data (e.g., any information that can be used to identify a person in an image or sound recording). For example, the device 102 is a mobile or portable computing device, such as an IoT camera device or mobile telephone, a user wearable device, such as a smart watch or head-mounted-display, one or more sensor systems on a vehicle, or one or more sensors in an autonomous computing device, among others. The device 102 can be any device capable of being carried, worn or mounted to or in an object and that acquires data including personally identifiable data.

The device 102 also includes a processing module or device, illustrated as an edge computing device 114 that processes the acquired data, such as images or sounds, to remove the personally identifiable data before transmission at 116. The edge computing device 114 is any type of computing device that allows for removing the personally identifiable data before transmission of the data from the device 102 to a remote system 118 (e.g. a cloud computing and storage system). In an IoT environment, the edge computing device 114 performs processing at the "edge" of the network (e.g., within the device 102). Thus, in one example, the processing to remove the personally identifiable data for transmission at 116 is performed by the device 102. However, the edge computing device 114 or the computing to remove the personally identifiable data, in some examples, is performed (or partially performed) at any location near the source of the data, which is not necessarily within the device 102 (e.g., a local computing device connected to the device 102). As such, the processing or partial processing to remove the personally identifiable data for transmission at 116 in these examples is performed outside of the device 102.

In one aspect, the device 102 includes one more sensors, illustrated as the sensor 108 in FIG. 1 that is capable of collecting personally identifiable data from, for example, a camera having the lens 106 or the microphone 110. This data is stored temporarily in a memory 120 of the device 102 in some examples. The edge computing device 114 is configured in various examples to use a machine learning approach or other algorithm to process the acquired data to determine higher level insights that are communicated to the remote system 118, which is information that does not have any personally identifiable data (i.e., non-personally identifiable data). For example, the edge computing device 114, in one example, uses a machine learning approach to determine generally useful statistics about a space, such as the number of people in a room, and reports this information to the remote system 118 instead of data from the imaged area 104 that includes images of faces of individuals (or other identifiable characteristics of the individuals). As a result, abstracted data that includes higher-level insights can then be transmitted over the network without security risk concerns related to sending personally identifiable information. In one example, the insights can then be aggregated in the cloud to develop predictions and insights about the area, such as the number of expected people next week at a similar time in the particular location corresponding to the imaged area 104. It should be noted that different identifiable characteristics other than faces are contemplated by the present disclosure. Thus, the removal of personally identifiable information is not limited to using only faces within images, but can also additionally or alternatively include different identifying characteristics of the person.

Different approaches to removing the personally identifiable data are contemplated by the present disclosure, which include abstracting or redacting the acquired information before transmission. In some examples, the images are abstracted such that only non-image data relating to the images is transmitted, such as a number of people in the images. This abstraction in one example includes only sending information relating to the image, but not sending the image itself. The information can include the number of people in the image, the locations of each person, the relative movement of each person, an estimated height of the person, etc. This information is determined in some examples using image analysis techniques that allow for segmenting objects and determining information regarding the objects (e.g., image segmentation to identify objects as people). However, in other examples, different sensed information can be used to identify objects, such as concurrently acquired audio information, which can be used to identify the gender of the person.

In one example, after the abstracted information relating to the acquired image is generated, the image is deleted, and the abstracted information transmitted from the device 102. Thus, no images are transmitted from the device 102 in this example, but instead the image information is abstracted. Additionally, no long-term storage of personally identifiable information is maintained on the device 102 when the abstraction is performed periodically (e.g., each day, every twelve hours, upon acquiring a predetermined number of images, etc.). Thus, when data is transmitted from the device 102, in various examples, the data does not have to be encrypted.

In some examples, personally identifiable information is removed from the acquired data while keeping the data generally intact. In one example, with respect to acquired images, the edge computing device 114 is configured to use a machine learning algorithm that redacts the personally identifiable information, such as to obscure (e.g., blurs) faces of individuals (first identified by a facial recognition algorithm) to ensure that the individuals are not identifiable from the data that is being transmitted. For example, the images of the faces are blurred or otherwise made non-recognizable, such as by changing facial characteristics or providing a colored circle over the face. Then, a higher-level algorithm in the cloud (a cloud algorithm), such as at the remote system 118, aggregates the obscured images to produce higher level insights, which is performed in some examples using image segmentation and processing techniques to identify objects in the images, including a number of people in the images as described herein.

In some examples, the device 102 with the edge computing device 114 is configured as a computer vision system that includes a learning mechanism for processing the acquired data to remove the personally identifiable aspects of that data, thereby cleansing the acquired data of personally identifiable aspects. It should be appreciated that different types of learning algorithms can be used, such as algorithms that implement decision trees or forests, pixel classification methods, disambiguation methods, etc. For example, the edge computing device 114 in one example is configured to classify imaged pixels as pixels of a person (or living object) and pixels that are not a person (e.g., identify a pixel as human or not human and transmit a percentage value for of human and non-human pixels for a particular object).

In other examples, the device 102 is configured having a hardware and/or software solution that executes on the device 102 and prevents one or more applications operating on the device 102 from sending personally identifiable information over the network, such as to the remote system 118. For example, a specialized networking device is configured to analyze information transmitted from the device 102 and prevents images or other data having personally identifiable data from leaving the device 102 (which can be through a wired or wireless communication link). In some examples, the operating system and application layer are controlled to prevent personally identifiable data from being transmitted from the device 102.

In one example, the edge computing device 114 (or a special network card (not shown)) is configured to confirm ("double-check") that the data to be transmitted from the device 102 does not include personally identifiable data. For example, before transmitting data from the device 102, a determination is made, such as based on learned properties by the edge computing device 114, that images having personally identifiable data (e.g., non-obscured images that are identified as showing one or more faces) are going to be transmitted from the device. If it is determined that the data to be transmitted includes personally identifiable data, this data will be blocked from being transmitted from the device 102. In one example, if the data to be transmitted is determined not to be a value, the device 102 blocks the transmission of that data as potentially including personally identifiable data (e.g., including an image with a face of a person).

The algorithms, in some examples, are configured to operate on a lower power device, such as an IoT device having a primary function other than data processing (e.g., image acquisition). However, depending on the processing capabilities of the device 102, more processor intensive algorithms are implemented.

The device 102 in some examples is tamperproof or provides mechanisms to reduce the likelihood or ensure that the personally identifiable data cannot be accessed. For example, the images are deleted after a predetermined time period or after the images having the personally identifiable data removed have been transmitted from the device 102. In one example, the images are deleted as soon as the images are no longer needed, such as after the image data relating the images has been abstracted. As another example, if the device 102 is not capable of operation, the personally identifiable data on the device 102 is automatically erased (e.g., erase all personally identifiable information in the event of a power loss). In one aspect, all of the memory on the device 102 is volatile memory to provide the automatic erasure functionality. In another aspect, if unauthorized access is attempted (e.g., a number of attempted logins is exceeded), the personally identifiable data on the device 102 is automatically erased. It should be noted that in some examples, only the data having personally identifiable aspects is erased (e.g., images with faces), while the data not having personally identifiable aspects (e.g., images without faces) is not erased. However, all data is erased in some examples that fall within the above-described scenarios.

While the device 102 is described as being configured as a people counter (e.g., a camera acquiring images of a room and continually transmitting frames of data) capable of detecting and tracking movement of people, the present disclosure contemplates different applications using any type of device that acquires personally identifiable data, such as any information that includes a personally identifiable aspect (e.g., allows identification of a person in the image). In some examples, the personally identifiable data is data associated with a person who has not opted into or otherwise authorized acquisition of the personally identifiable data (e.g., a person who has not authorized surveillance monitoring or tracking).

The device 102 in some examples is located in a public location. For example, the device 102 is placed in a public space, such as a retail location, a workplace, a school, etc. In these public spaces, where a user has not agreed to being monitored or has not opted into being monitored and having personally identifiable data collected (e.g., has not opted in to personally identifiable data transmission), the device 102 can be used as a result of the removal (or "stripping") of the personally identifiable data before the data is transmitted from the device 102. Thus, the device 102 is used for tracking or monitoring of people (or performing other types of analytics) in shared spaces.

The present disclosure in some examples also reduces legal or compliance requirements, for example the data collection or retention legal requirements, such as on large enterprises. For example, with the device 102, a reduced amount of data is stored, or the data stored for a shorter period of time as a result of removing the personally identifiable information (e.g., not subject to legal retention requirements for personal data or smaller non-image data files are stored with the image data files deleted).

Various aspects allow for spatial analytics in different locations (e.g., public or work areas) with reduced burden or concern for data security. The inventive aspects in one example are implemented in connection with spatial analytics on a local level or a national level (e.g., people counting in a room, in a city or in a country). For example, various aspects are used in an application that tags photographs on a plurality of mobile telephones, which is aggregated, such as in a server/client relationship.

Figure 2:
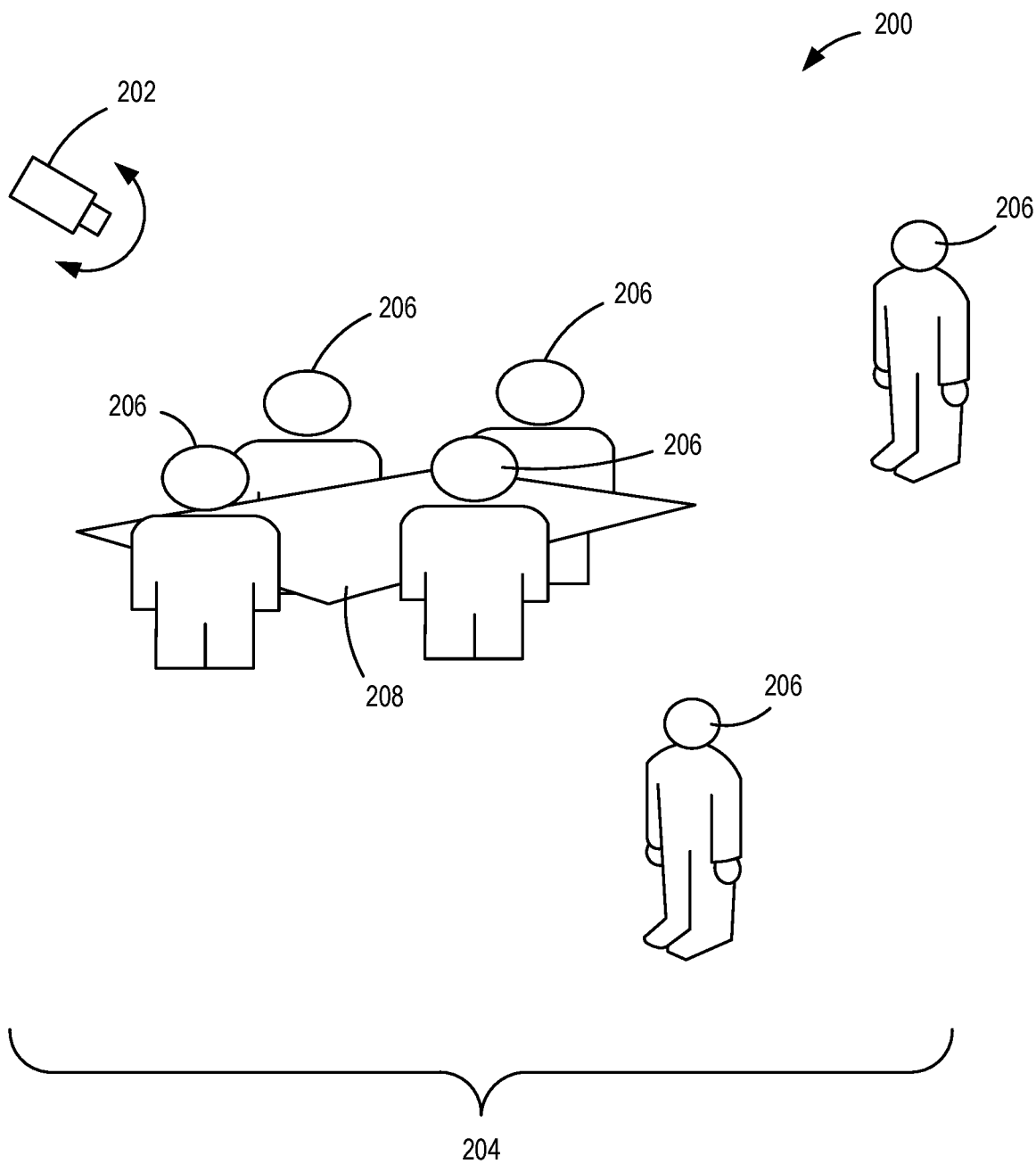
FIG. 2 illustrates an exemplary application according to an embodiment.

FIG. 2 is an exemplary diagram showing a configuration in which various aspects of the invention can be implemented. FIG. 2 is an office environment 200 wherein a sensor, illustrated as a camera 202 monitors a public space 204, which can be an office conference room, for example. Within the monitored public space 204 are living objects 206, illustrated as people, and a non-living object 208, illustrated as a table. The camera 202 is operable to acquire video images and/or still images of the public space 204 (e.g., perform continuous surveillance monitoring). Optionally, the camera 202 is operable to acquire audio (e.g., voices) from the public space 204. The camera 202 is movable, in this example, to change a field-of-view of the camera 202. The camera 202, in one example, is a camera assembly that includes various components, such as a lens, a sensor, mirrors, a prism, and so forth.

In one example, the camera 202 is embodied as or forms part of the device 102 (shown in FIG. 1) such that the camera 202 is configured to remove personally identifiable data from images or audio acquired by the camera 202. The camera 202 is, thus, capable of being used to monitor the public space 204, such as to perform people counting or other spatial analytics without concern or with a reduced concern for a security risk as a result for implementation of the herein disclosed aspects that remove personally identifiable information from the acquired data. As such, the acquired data can be transmitted, for example, to a cloud system for aggregation without including personally identifiable information. For example, as described herein, by abstracting the information on the camera 202 and sending only insights to the cloud system, transmission of the information is provided with reduced burdens of maintaining the security of the information because the personally identifiable information has been removed.

In one example, instead of sending images acquired by the camera 202, such as pictures of a room full of people, the camera 202 is configured to abstract the images to generate and send non-image data, such as the number of people in the room instead of pictures showing the faces of the people. Thus, the image information is anonymized (abstracted) before being transmitted from the camera 202, such that personally non-identifiable data is transmitted. However, in some examples, as described herein, the image information is redacted instead of abstracted, such that the images are still transmitted, but with the personally identifiable information obscured (e.g., faces in the images blurred, removed or covered), such that again, personally non-identifiable data can be transmitted.

Figure 3:
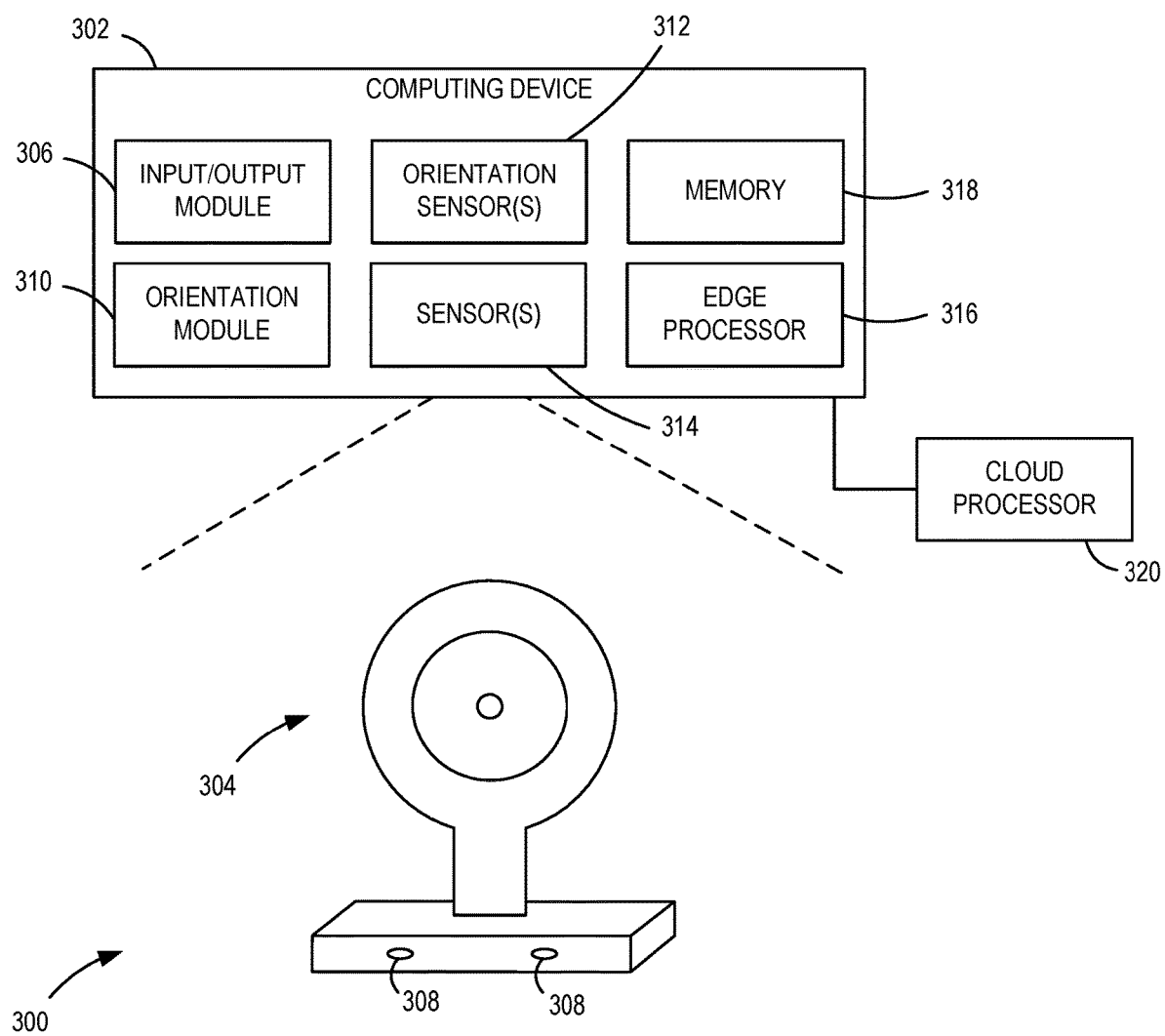
FIG. 3 is an exemplary block diagram illustrating a system including a computing device configured for removing personally identifiable data before the data is transmitted according to an embodiment.

FIG. 3 is a block diagram showing an operating configuration 300 according to an embodiment. The operating configuration 300 is operable to employ techniques described herein. The operating configuration 300 is an example of a computing device 302 that is physically and communicatively coupled to an input device 304, illustrated as an IoT camera. The computing device 302 can be configured in a variety of ways. For example, the computing device 302 can be configured for mobile use, such as a mobile camera as illustrated, a tablet computer, a wearable device, and so on. In one example, the computing device 302 is a low-resource device with limited memory and/or processing resources. However, the computing device in other examples is a full resource device with substantial memory. The computing device 302 can also relate to software that causes the computing device 302 to perform one or more operations, such as to remove personally identifiable data before transmission.

In one example, the computing device 302 includes an input/output module 306. The input/output module 306 is representative of functionality relating to processing of inputs and rendering outputs of the computing device 302, such as an input requesting the capture of images to be analyzed for a people counter. A variety of different inputs can be processed by the input/output module 306, such as inputs relating to functions that correspond to buttons 308 of the input device 304. The input/output module 306 in some examples supports a variety of different input techniques including key presses, gestures, and so on. The input device 304 and buttons 308 can assume a variety of different configurations to support a variety of different functionality.

The computing device 302 optionally includes an orientation module 310, which is representative of functionality to determine a positional orientation of the computing device 302. For example, the orientation module 310 can utilize orientation information received from one or more orientation sensors 312. The orientation sensors 312 are representative of functionality to detect types of orientation information for the computing device 302, such as angles relative to gravity, relative tilt, angle relative to earth's magnetic field, and so forth. Examples of the orientation sensors 312 include an accelerometer, magnetometer, tilt sensor, gyroscope, inclinometer, and so on. A variety of other types of orientation sensors 312 can additionally or alternatively be employed.

The orientation module 310 in some examples utilizes the orientation information to determine a relative orientation of the computing device 302. The relative orientation, for example, can indicate an angle at which the computing device 302 is tilted, such as with reference to the ground, e.g., earth's gravitational field. Orientation information can be used to perform various tasks, such as to identify a particular public area at which the input device 304 is pointed.

The computing device 302 further includes one or more sensor(s) 314, which in some examples, form part of a camera assembly, which is representative of the functionality to capture images, such as still images, video, and so on. In other examples, the one or more sensors(s) 314 form part of a microphone, which is representative of the functionality to capture audio. In an image capture setting, the camera assembly includes various image capture components, such as a lens, a mirror, an electronic image sensor, and so on. The camera assembly can also include structural components employed to mount image capture components into the computing device 302, such as a component carrier in which the image capture components can be installed. The component carrier enables the image capture components to be securely mounted in the computing device 302. In one example, the computing device 302 forms part of the input device 304.

The computing device 302 also includes a processing module, illustrated as an edge processor 316, which is representative of functionality to perform various operations related to, for example, image capture and processing, including removing personally identifiable data from the captured images, such as described in the various examples herein. The edge processor 316 or other processing modules, in some examples, also causes adjustments to be made to various components of the sensor(s) 314 and can use orientation information received from the orientation module 310 and/or the orientation sensors 312. The edge processor 316 or other processing modules, in some examples, use the orientation information to perform various operations, such as adjusting components of the camera assembly, image manipulation based on orientation of the computing device 302, and so forth.

The computing device 302 further includes memory 318 to store acquired data, such as acquired images or audio. In one example, the acquired data is stored temporarily, such as until the personally identifiable data has been removed and the abstracted or redacted data (having the personally identifiable data removed) is transmitted from the computing device 302. In the illustrated example, the abstracted or redacted data is communicated to a cloud processor 320, which is remote from the computing device 302 and can form part of the IoT. Thus, the cloud processor 320 can be an IoT processor capable of aggregating data from a plurality of computing devices 302. The data stored in the memory 318 also is completely erased in some examples upon a power failure of the computing device 302 or when tampering of the computing device 302 is detected.

Thus, in various examples, the computing device 302 is configured to remove personally identifiable data before the data is transmitted from the computing device 302. The personally identifiable data is removed, for example, by abstraction or redaction as described herein. As such, the computing device 302 in various examples, while collecting personally identifiable data, only sends anonymized higher-level insights (abstracted data) or data having obscured elements (redacted data) to the cloud processor 320.

Figure 4:
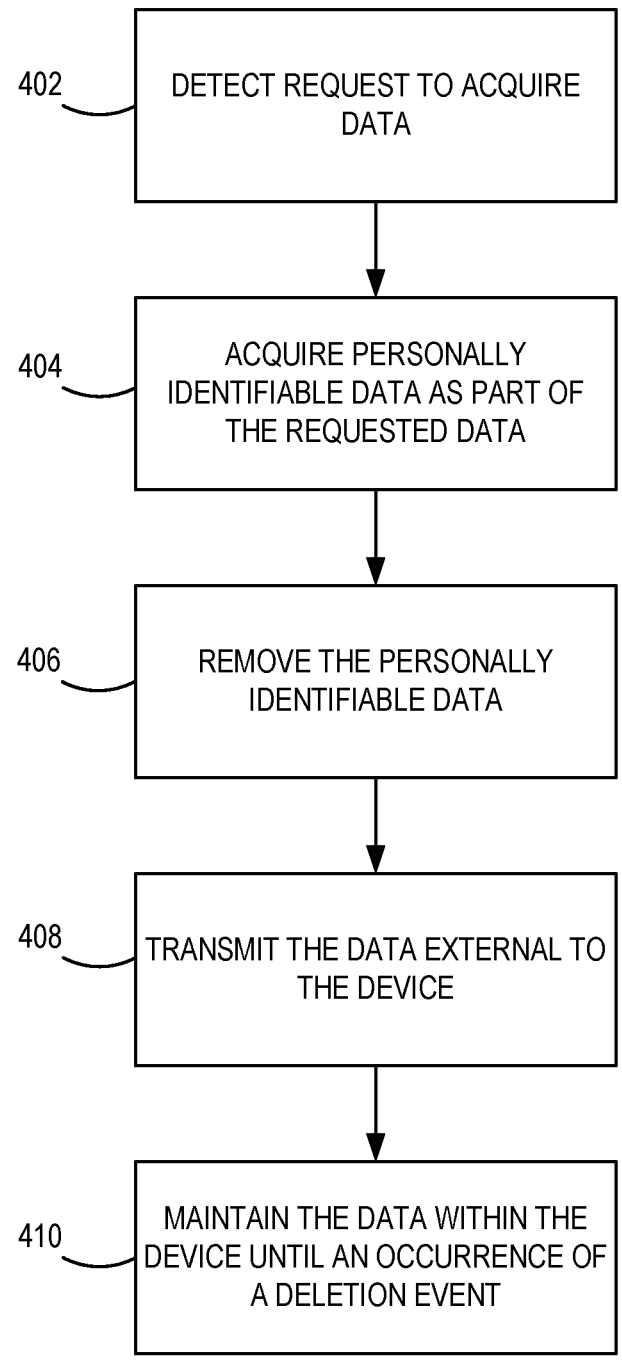
FIG. 4 is an exemplary flow chart illustrating operation of a computing device for removing personally identifiable data before transmission according to an embodiment.

FIG. 4 is an exemplary flow chart 400 illustrating operation of a device (e.g., a computing device such as the device 302, etc.) to perform removal of personally identifiable data before data transmission from the computing device. The operations illustrated in the flow charts described herein can be performed in a different order than is shown, can include additional or fewer steps and can be modified as desired or needed. Additionally, one or more operations can be performed simultaneously, concurrently or sequentially.

At 402, the device detects a request to acquire data, such as for analytics. In one example, this request results in acquiring monitoring data. In one particular example, a people counting operation is initiated, which includes acquiring images to be analyzed to determine a number of people in the images over time. That is, a surveillance or tracking operation is initiated that includes acquisition of images of a monitored area. As a result, the requested data is acquired, such as by a camera of the device (e.g., IoT camera), which includes the acquisition of personally identifiable data at 404. For example, images of people are acquired in a public space as part of image monitoring of the public space. These acquired images includes personally identifiable data, including images of faces of people in the public space.

At 406, the personally identifiable data is removed, such as by a configured edge processor that abstracts or redacts the personally identifiable data. For example, and continuing with the people counting application, the images are analyzed to determine a number of people in the images and a value representing the number of people in the public space is generated for transmission instead of the image, thereby abstracting the personally identifiable data. For example, raw statistical data, such as the number of people in the public space over time is generated using analytical and image segmentation techniques. This process allows for non-image data to be transmitted instead of image data, thereby removing the personally identifiable data before transmission. As another example, the faces of the people in the images are obscured (e.g., blurred), thereby redacting the personally identifiable data. In this case, while the images are still transmitted, any features in the images that would allow for identification of the people within the images is obscured or otherwise removed (e.g., blanked out or colored out).

At 408, the device transmits the data to an external location, such as a cloud computing system or cloud storage system remote from the device. As should be appreciated, the data that is communicated outside of the device no longer contains the personally identifiable data. That is, the device communicates abstracted or redacted data to the cloud service. In one example, only the data having the personally identifiable aspects removed is maintained in a memory of the device. For example, the original data, such as images of faces, is deleted after being processed or after the personally identifiable aspects have been removed and that data transmitted outside the device. In some examples, after the processed data that is representative of non-personally identifiable data has been transmitted from the device, that data is also deleted from the device. However, in some examples, the original acquired data is maintained for a defined time period (e.g., for twenty-four hours after transmission).

Thus, acquired data is maintained within the device at 410 until an occurrence of a deletion event is detected. In some aspects, the deletion event is the processing of the personally identifiable data. In other aspects, the deletion event is the transmission of the non-personally identifiable data from the device. In still other aspects, the deletion event is a power failure or power loss of the device, or a detected tampering of the device. In yet other aspects, the deletion event is a define time period. It should be appreciated that the above-described deletion events are merely examples, and other deletion events can be defined.

Figure 5:
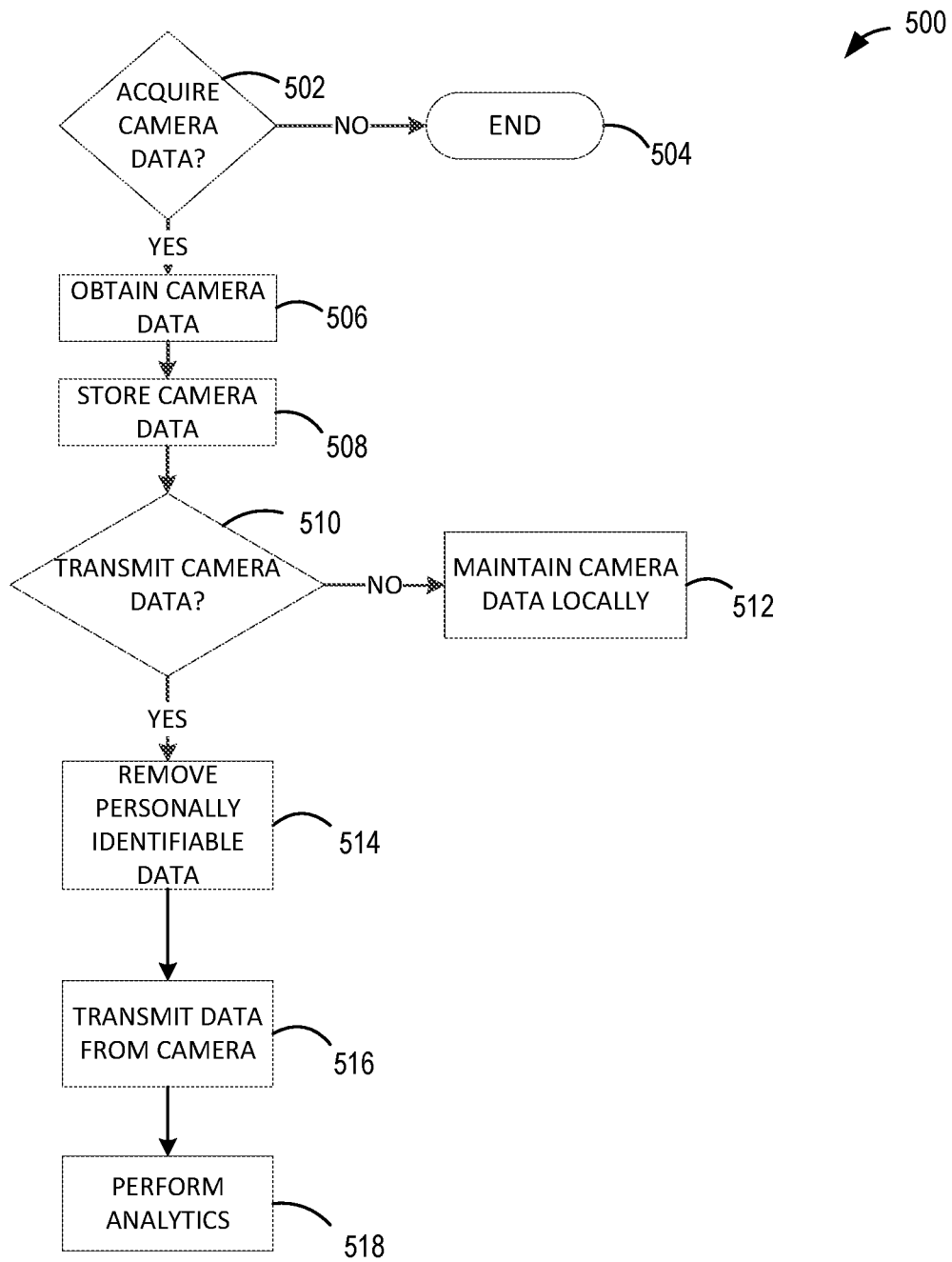
FIG. 5 is an exemplary flow chart illustrating operation of a computing device for generating abstracted or redacted information for transmission from the computing device according to another embodiment.

FIG. 5 is an exemplary flow chart of a method 500 illustrating operation of a computing device (e.g., device 302, etc.) to generate abstracted or redacted information for transmission from the computing device. It should be appreciated that the computing device is implementable in different systems and applications. Thus, while the below-described example is discussed in connection with a people monitoring application, the computing device configured according to the present disclosure is useable in many different applications, including any application where the acquired information includes personally identifiable data.

At 502, a determination is made by the computing device whether camera data (e.g., image and/or vide data) is to be acquired. For example, when a surveillance or people counting mode of a camera (e.g., video camera) having the computing device coupled thereto is switched to an active mode, a determination is made that camera data is to be acquired. As another example, motion within a public space (e.g., a conference room) can trigger activation of the camera, thereby indicating that camera data is to be acquired. If no event is detected that indicates that camera data is to be acquired, the method ends at 504.

If a determination is made at 502 that camera data is to be acquired, the computing device begins obtaining camera data at 506. In some examples, the camera data includes both image data and audio data having personally identifiable data collected therewith. For example, facial image or voices identifying specific individuals is collected when the camera obtains the image data and audio data. In some examples, the image data and audio data is obtained at the same time, such as during a video recording session. It should be noted that in some examples, only image data or only audio data is obtained.

The obtained camera is the stored at 508. More particularly, images and/or audio acquired by the camera is stored locally within a storage device of the camera. In some examples, the stored camera data is raw image and/or audio data that contains personally identifiable data corresponding to images of people or voices of people. In one example, the camera data having the personally identifiable data is stored in a protected mode within the camera to prevent unauthorized access to that data.

The computing device then determines at 510 whether the camera data is to be transmitted from the camera. That is, a determination is made whether the camera data is to be transmitted external to the camera, such as to a cloud server. The transmission of the camera data from the camera occurs at defined time periods in some examples (e.g., every twenty-four hours). In other examples, the transmission of the camera data from the camera occurs upon the detection of an event (e.g., storage on the camera nearing capacity or a request for transmission). It should be appreciated that any event that results in the removal of the camera data from the camera corresponds to data being transmitted from the camera.

If a determination is made that camera data is not to be transmitted, the camera data is maintained locally within the storage of the camera at 512. In some examples, the camera data is maintained indefinitely, such as until a request is made to remove the camera data from the camera. However, in other examples, the camera data is automatically deleted upon the occurrence of a detected event. For example, the detected event can be the expiration of a defined time period, a tampering with the camera, etc.

If a determination is made that the camera data is to be transmitted from the camera, the computing device removes personally identifiable data at 514 before any transmission of the camera data from the camera. For example, before the locally maintained camera data that includes the personally identifiable data is transmitted external to the camera, the camera data is processed to remove the personally identifiable data, such as by an abstraction process or a redaction process. If the camera data includes images, the abstraction process includes anonymizing the personally identifiable data, such as by determining a number of people in the images and generating a people count value. Thereafter, the images are deleted in some examples, which can occur immediately after the abstraction, after the abstracted data is transmitted from the camera, after a defined time period, etc. Thus, the abstraction process in various embodiments results in the complete deletion of the acquired camera data, such as deletion of the acquired images after the gathered information therein is abstracted.

It should be appreciated that a similar process can be applied to audio data, wherein voice data is abstracted to identify a count of a number of people's voices recorded over a defined time period, which can include a determination of other information, such as the number of male and female voices. This information also can be abstracted as a count value. The process to abstract the images can include any object segmentation technique in the image processing technology and the process to abstract the audio can include any voice recognition technique in the voice analysis technology. As such, personally identifiable data is removed from the camera data.

In other examples, the camera data is redacted, such that the data is not deleted, but instead modified such that the personally identifiable data is not longer recognizable. For example, with respect to image data, facial images or other recognizable features in pictures or video are obscured or removed, such as by blurring, covering or removing the facial images or other recognizable features. In some examples, the redaction includes a permanent redaction of the image data that cannot be undone. Regarding audio data, a similar process can be performed, such as to change the pitch or other characteristics of the voice to make the voice personally unrecognizable. The process to redact the images can include any image modification technique in the image processing technology and the process to redact the audio can include any voice modifying technique in the voice processing technology. As such, personally identifiable data is removed from the camera data, but the camera data is not entirely deleted, and instead a modified version results.

The computing device then transmits the data from the camera at 516. In particular, the camera data having the personally identifiable data removed is transmitted external to the camera, such as to a cloud server. The transmitted data includes only non-image and non-audio data (i.e., anonymized data) in some examples, such as numeric data relating to a number of people in the acquired image and audio that is used by the cloud server to perform analytics at 518. Thus, images and/or audio having personally identifiable data are prevented from being transmitted from the camera.

In other examples, modified image or audio data having the personally identifiable data removed by abstraction is transmitted from the camera. For example, blurred or obscured images or modified audio is transmitted to the cloud server to perform analytics at 518. In this example, the data is further analyzed by the cloud server to identify the number of people in the images, etc.

It should be appreciated that the data transmitted from the camera at 516 can be transmitted to any external device or system, such as to a remote storage device for longer term storage. However, in this case, the data being stored does not include any personally identifiable data. It should also be appreciated that the method 500 in some examples is performed in connection with other devices, such as sensors coupled with automobiles, aircraft, home security systems, portable computers, mobile telephones, augmented reality (AR) systems, virtual reality (VR) systems, etc. Additionally, the acquired data can be used for different analytical applications and is not limited to people counting. For example, the acquired data can relate to the motion of people, counting or motion of cars, etc.

Thus, the present disclosure can use any type of edge computing or machine learning to obtain higher level insights on personally identifiable data on the device itself instead of sending the data to the cloud to be analyzed. For example, the local device processes the acquired data such that only the insights are sent to the cloud. As such, instead of sending a picture of a room full of people to the cloud, the device sends the number of people in the room or a count value (e.g., an updated count value).

Figure 6:
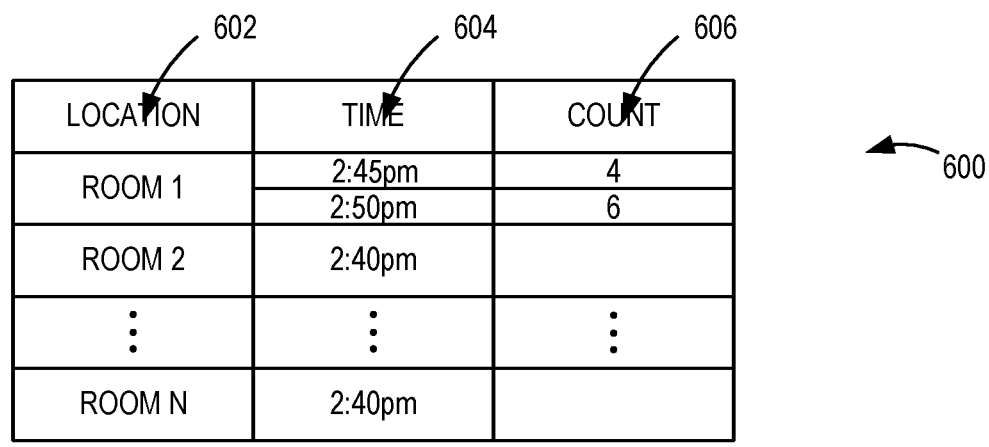
FIG. 6 illustrates abstracted information having personally identifiable data removed according an embodiment.

For example, a table 600 is shown in FIG. 6 that illustrates the abstracted information generated in accordance with the present disclosure. As can be seen, the abstracted information includes location identity information 602 (e.g., name of a room being monitored), time information 604 and count value information 606. The count value information 606 in this example is the number of people in the room corresponding to the location identity information 602 at the time indicated by the time information 604. In the illustrated example, the abstracted people count of six at the time 2:50 p.m. in Room 1 corresponds to an image acquired of the public space 204 shown in FIG. 2. As should be appreciated, the number of people changes over time and the abstracted information in some examples shows the abstracted number at each of the different times, such as showing the abstracted people count of four at the time 2:45 p.m. in Room 1. However, in some examples, the count value information 606 is a running tally with only a current value being determined. Thus, in this example, non-image information is transmitted from the computing device as the abstracted data having the personally identifiable data removed.

Figure 7:
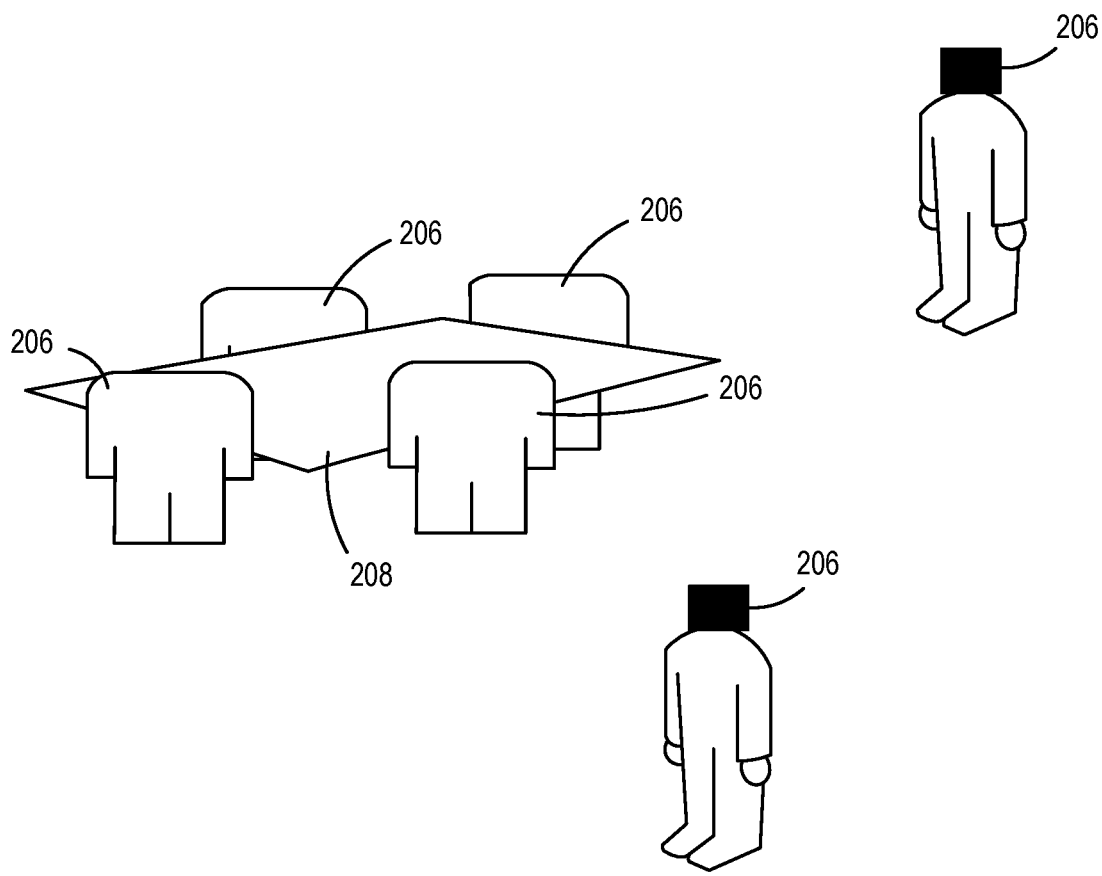
FIG. 7 illustrates redacted information having personally identifiable data removed according an embodiment.

As another example, FIG. 7 illustrates an image 700 having redacted image data corresponding to an image acquired of the public space 204 shown in FIG. 2. As can be seen, the living objects 206, which are people, have the image portion of their heads removed or covered by black squares in the image 700, such that the people are not identifiable. As should be appreciated, any type of obscuring or removal of the heads or faces of the living objects 206 in the image can be used. When the image data is removed, the data is permanently removed in some examples, such as being replaced with background color pixels or black pixels in the image 700. Thus, in this example, modified image information is transmitted from the computing device as the redacted data having the personally identifiable data removed.

Thus, in some configurations, the image is anonymized before the image is sent to the cloud. In some configurations, a hardware implementation is configured to prevent a "rogue" program from sending image data (or other personally identifiable data) over the network. In some configurations, personally identifiable data is erased in the event of tampering or power loss of the device. Accordingly, various aspects result in the device being a "smarter" device that is capable of removing personally identifiable data before the data is transmitted and/or confirming that data to be transmitted does not contain personally identifiable data.

Exemplary Operating Environment

Figure 8:
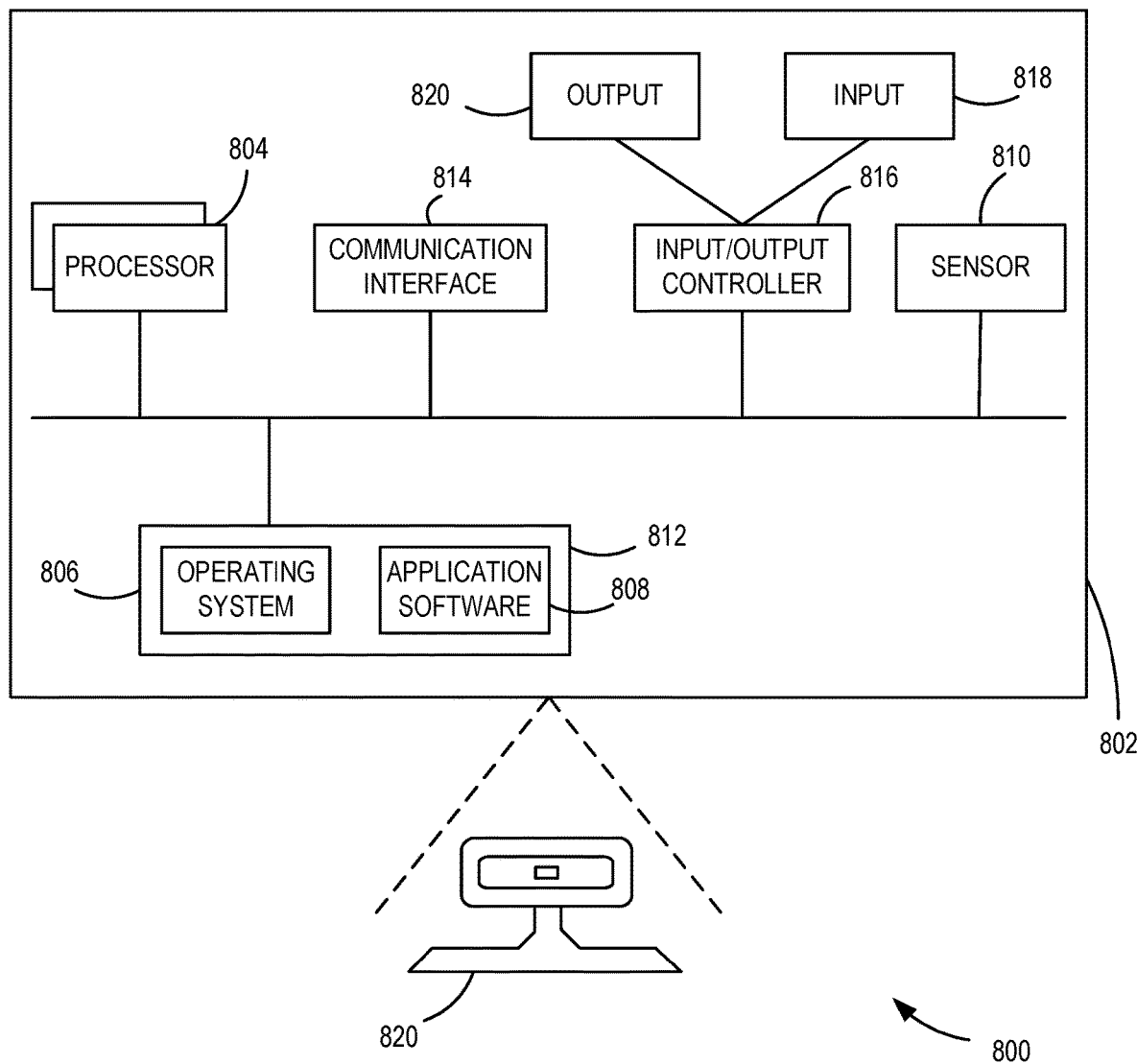
FIG. 8 illustrates a computing apparatus according to an embodiment as a functional block diagram.

The present disclosure is operable with a computing apparatus 802 according to an embodiment as a functional block diagram 800 in FIG. 8. In an embodiment, components of the computing apparatus 802 may be implemented as a part of an electronic device according to one or more embodiments described in this specification. The computing apparatus 802 comprises one or more processors 804 which may be microprocessors, controllers or any other suitable type of processors for processing computer executable instructions to control the operation of the computing apparatus 802. Platform software comprising an operating system 806 or any other suitable platform software may be provided on the computing apparatus 802 to enable application software 808 to be executed on the computing apparatus 802. According to an embodiment, capture of personally identifiable data by a sensor 810, such as capture of image frames by a camera (e.g., IoT camera) for spatial analytics may be accomplished by software.

Computer executable instructions may be provided using any computer-readable media that are accessible by the computing apparatus 802. Computer-readable media may include, for example, computer storage media such as a memory 812 and communications media. Computer storage media, such as the memory 812, include volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 812) is shown within the computing apparatus 802, it will be appreciated by a person skilled in the art, that the storage may be distributed or located remotely and accessed via a network or other communication link (e.g. using a communication module, such as a communication interface 814).

The computing apparatus 802 in one example includes an input/output controller 816 configured to output information to one or more input devices 818 and output devices 820, for example a display or a speaker, which may be separate from or integral to the electronic device. The input/output controller 816 in some examples is configured to receive and process an input from one or more input devices 818, such as a control button or touchpad. In one example, the output device 820 acts as the input device 818. An example of such a device may be a touch sensitive display. The input/output controller 816 in one example also outputs data to devices other than the output device 820, e.g. a locally connected printing device. In some examples, a user provides input to the input device(s) 818 and/or receives output from the output device(s) 820.

In one examples the computing apparatus 802 detects voice input, user gestures or other user actions and provides a natural user interface (NUI). This user input is used to author electronic ink, view content, select ink controls, play videos with electronic ink overlays and for other purposes. The input/output controller 816 outputs data to devices other than a display device in some examples, e.g. a locally connected printing device.

NUI technology enables a user to interact with the computing apparatus 802 in a natural manner, free from artificial constraints imposed by input devices such as mice, keyboards, remote controls and the like. Examples of NUI technology that are provided in some examples include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that are used in some examples include intention and goal understanding systems, motion gesture detection systems using depth cameras (such as stereoscopic camera systems, infrared camera systems, red green blue (rgb) camera systems and combinations of these), motion gesture detection using accelerometers/gyroscopes, facial recognition, three dimensional (3D) displays, head, eye and gaze tracking, immersive augmented reality and virtual reality systems and technologies for sensing brain activity using electric field sensing electrodes (electro encephalogram (EEG) and related methods).

This NUI technology may be used to obtain image frames by controlling the sensor 810.

The functionality described herein can be performed, at least in part, by one or more hardware logic components. According to an embodiment, the computing apparatus 802 is configured by the program code when executed by the processor(s) 804 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures. Additionally, in some aspects, the computing apparatus 802 is a lower power device having reduced processing capabilities.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

Alternatively, or in addition to the other examples described herein, examples include any combination of the following:

A device for removal of personally identifiable data, the device comprising:
  at least one processor; and
  at least one memory comprising computer program code, the at least one memory and the computer program code configured to, with the at least one processor, cause the at least one processor to:
    receive monitoring data acquired by a sensor, the monitoring data including personally identifiable data relating to one or more individuals being monitored;
    process the acquired monitoring data to remove the personally identifiable data by at least one of abstraction or redaction while the monitoring data is located on the device; and
    transmit the processed monitoring data external to the device, the processed monitoring data having the personally identifiable data removed.

The device described above, wherein the monitoring data includes at least one of images or audio of the one or more individuals, and the computer program code is further configured to, with the at least one processor, cause the at least one processor to abstract the monitoring data to remove the personally identifiable data by anonymizing details relating to the images or audio to generate personally non-identifiable data relating to the individuals visible in the images or heard in the audio.

The device described above, wherein the computer program code is further configured to, with the at least one processor, cause the at least one processor to perform the anonymizing by generating, as the personally non-identifiable data, a count value indicative of a number of the one or more individuals in the monitoring data and delete the monitoring data after performing the anonymizing.

The device described above, wherein the one or more individuals are monitored within a public space and the computer program code is further configured to, with the at least one processor, cause the at least one processor to perform the anonymizing by generating, as the personally non-identifiable data, higher-level insight data to be aggregated to generate predictions regarding a future number of people in the public space.

The device described above, wherein the monitoring data includes at least one of images or audio of the one or more individuals, and the computer program code is further configured to, with the at least one processor, cause the at least one processor to redact the monitoring data to remove the personally identifiable data by obscuring identifiable features of the individuals in the images or changing sound characteristics of voices of the individuals in the audio.

The device described above, wherein the personally identifiable data are images of a faces of the one or more individuals and the computer program code is further configured to, with the at least one processor, cause the at least one processor to transmit the images with personally identifiable facial characteristics removed to a cloud computing device to perform spatial analytics, including people counting.

A computerized method for removal of personally identifiable data from a device, the computerized method comprising:

receiving acquired data that includes personally identifiable data;

processing the acquired data locally at a device to remove the personally identifiable data from the monitoring data while the monitoring data is located on the device; and transmitting the processed monitoring data external to the device, the processed monitoring data having the personally identifiable data removed.

The computerized method described above, wherein the acquired data comprises monitoring data including at least one of images or audio of individuals, and the processing further comprises at least one of abstracting or redacting the personally identifiable data from the monitoring data.

The computerized method described above, wherein the acquired data comprises monitoring data including at least one of images or audio of individuals, and the processing further comprises abstracting the monitoring data to remove the personally identifiable data by anonymizing details relating to the images or audio to generate personally non-identifiable data relating to the individuals visible in the images or heard in the audio.

The computerized method described above, wherein the anonymizing comprises generating, as the personally non-identifiable data, a count value indicative of a number of individuals in the monitoring data and further comprising deleting the monitoring data after performing the anonymizing.

The computerized method described above, wherein the one or more individuals are monitored within a public space and further comprising anonymizing by generating, as the personally non-identifiable data, higher-level insight data to be aggregated to generate predictions regarding a future number of people in the public space.

The computerized method described above, wherein the acquired data comprises monitoring data including at least one of images or audio of individuals, and the processing further comprises redacting the monitoring data to remove the personally identifiable data by obscuring identifiable features of the individuals in the images or changing sound characteristics of voices of the individuals in the audio.

The computerized method described above, wherein the personally identifiable data are images of a faces of one or more individuals and further comprising transmitting the images with personally identifiable facial characteristics removed to a cloud computing device to perform spatial analytics, including people counting.

One or more computer storage media having computer-executable instructions for connecting to a camera device that, upon execution by a processor, cause the processor to at least:

receive acquired data that includes personally identifiable data;

process the acquired data locally at a device to remove the personally identifiable data from the monitoring data while the monitoring data is located on the device; and transmit the processed monitoring data external to the device, the processed monitoring data having the personally identifiable data removed.

The one or more computer storage media described above, wherein the acquired data comprises monitoring data including at least one of images or audio of individuals, and having further computer-executable instructions that, upon execution by a processor, cause the processor to at least one of abstract or redact the personally identifiable data from the monitoring data.

The one or more computer storage media described above, wherein the acquired data comprises monitoring data including at least one of images or audio of individuals, and having further computer-executable instructions that, upon execution by a processor, cause the processor to at least abstract the monitoring data to remove the personally identifiable data by anonymizing details relating to the images or audio to generate personally non-identifiable data relating to the individuals visible in the images or heard in the audio.

The one or more computer storage media described above, having further computer-executable instructions that, upon execution by a processor, cause the processor to at least perform the anonymizing by generating, as the personally non-identifiable data, a count value indicative of a number of individuals in the monitoring data and further comprising deleting the monitoring data after performing the anonymizing.

The one or more computer storage media described above, wherein the one or more individuals are monitored within a public space and having further computer-executable instructions that, upon execution by a processor, cause the processor to at least perform the anonymizing by generating, as the personally non-identifiable data, higher-level insight data to be aggregated to generate predictions regarding a future number of people in the public space.

The one or more computer storage media described above, wherein the acquired data comprises monitoring data including at least one of images or audio of individuals, and having further computer-executable instructions that, upon execution by a processor, cause the processor to at least redact the monitoring data to remove the personally identifiable data by obscuring identifiable features of the individuals in the images or changing sound characteristics of voices of the individuals in the audio.

The one or more computer storage media described above, wherein the personally identifiable data are images of a faces of one or more individuals and having further computer-executable instructions that, upon execution by a processor, cause the processor to at least transmit the images with personally identifiable facial characteristics removed to a cloud computing device to perform spatial analytics, including people counting.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for removing personally identifiable data. The illustrated one or more processors 504 together with the computer program code stored in memory 512 constitute exemplary processing means for removal of personally identifiable data.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A device for removal of personally identifiable data, the device comprising:
    a sensor configured to acquire monitoring data;
    a storage device;
    at least one processor; and
    at least one memory comprising computer program code, the at least one memory and the computer program code configured to, with the at least one processor, cause the at least one processor to:
    store monitoring data acquired by the sensor, the monitoring data stored within the storage device including personally identifiable data relating to one or more individuals being monitored;
    process the monitoring data acquired by the sensor to remove the personally identifiable data by at least one of abstraction or redaction while the monitoring data is stored in the storage device;
    transmit the monitoring data having the personally identifiable data removed external to the device; and
    delete the monitoring data in response to the data having the personally identifiable data removed being transmitted external to the device.

2. The device of claim 1, wherein the monitoring data includes at least one of images or audio of the one or more individuals, and the computer program code is further configured to, with the at least one processor, cause the at least one processor to abstract the monitoring data to remove the personally identifiable data by anonymizing details relating to the images or audio to generate personally non-identifiable data relating to the one or more individuals visible in the images or heard in the audio.

3. The device of claim 2, wherein the computer program code is further configured to, with the at least one processor, cause the at least one processor to perform the anonymizing by generating, as the personally non-identifiable data, a count value indicative of a number of the one or more individuals in the monitoring data and delete the monitoring data one of immediately after performing the anonymizing, in response to a power failure of the device, or tampering of the device.

4. The device of claim 2, wherein the one or more individuals are monitored within a public space and the computer program code is further configured to, with the at least one processor, cause the at least one processor to perform the anonymizing by generating, as the personally non-identifiable data, insight data to be aggregated to generate predictions regarding a future number of people in the public space.

5. The device of claim 1, wherein the monitoring data includes at least one of images or audio of the one or more individuals, and the computer program code is further configured to, with the at least one processor, cause the at least one processor to redact the monitoring data to remove the personally identifiable data by obscuring identifiable features of the one or more individuals in the images or changing sound characteristics of voices of the one or more individuals in the audio.

6. The device of claim 1, wherein the personally identifiable data comprises images of faces of the one or more individuals acquired by the sensor and the computer program code is further configured to, with the at least one processor, cause the at least one processor to process the locally stored monitoring data in response to a determination that the monitoring data is to be transmitted external to the device, and block transmitting of the images in response to a determination that personally identifiable data is contained within in the images, otherwise transmit the images with personally identifiable facial characteristics removed to a cloud computing device to perform spatial analytics, including people counting.

7. A computerized method for removal of personally identifiable data from a device, the computerized method comprising:
    receiving acquired data that includes personally identifiable data, the data received from a sensor of a device;
    processing the acquired data locally at the device to remove the personally identifiable data from the acquired data while the acquired data is stored in the storage of the device;
    transmitting the acquired data having the personally identifiable data removed external to the device; and
    delete the acquired data in response to the data having the personally identifiable data removed being transmitted external to the device.

8. The computerized method of claim 7, wherein the acquired data comprises monitoring data including at least one of images or audio of individuals, and the processing further comprises at least one of abstracting or redacting the personally identifiable data from the monitoring data.

9. The computerized method of claim 7, wherein the acquired data comprises monitoring data including at least one of images or audio of individuals, and the processing further comprises abstracting the monitoring data to remove the personally identifiable data by anonymizing details relating to the images or audio to generate personally non-identifiable data relating to the individuals visible in the images or heard in the audio.

10. The computerized method of claim 9, wherein the anonymizing comprises generating, as the personally non-identifiable data, a count value indicative of a number of individuals in the monitoring data and further comprising deleting the monitoring data after performing the anonymizing.

11. The computerized method of claim 9, wherein the one or more individuals are monitored within a public space and further comprising anonymizing by generating, as the personally non-identifiable data, insight data to be aggregated to generate predictions regarding a future number of people in the public space.

12. The computerized method of claim 7, wherein the acquired data comprises monitoring data including at least one of images or audio of individuals, and the processing further comprises redacting the monitoring data to remove the personally identifiable data by obscuring identifiable features of the individuals in the images or changing sound characteristics of voices of the individuals in the audio.

13. The computerized method of claim 7, wherein the acquired data comprises monitoring data including images of individuals, and further comprising transmitting the images with personally identifiable facial characteristics in the images of the individuals removed to a cloud computing device to perform spatial analytics, including people counting.

14. One or more computer storage media having computer-executable instructions for connecting to a camera device that, upon execution by a processor, cause the processor to at least:
receive acquired data that includes personally identifiable data the data received from a sensor of a device;
store the data received from the sensor in a storage of the device,
process the acquired data locally at a device to remove the personally identifiable data from the acquired data while the acquired data is stored in the storage of the device;
transmit the acquired data having the personally identifiable data removed external to the device; and
delete the acquired data in response to the data having the personally identifiable data removed being transmitted external to the device.

15. The one or more computer storage media of claim 14, wherein the acquired data comprises monitoring data including at least one of images or audio of individuals, and having further computer-executable instructions that, upon execution by a processor, cause the processor to at least one of abstract or redact the personally identifiable data from the monitoring data.

16. The one or more computer storage media of claim 14, wherein the acquired data comprises monitoring data including at least one of images or audio of individuals, and having further computer-executable instructions that, upon execution by a processor, cause the processor to at least abstract the monitoring data to remove the personally identifiable data by anonymizing details relating to the images or audio to generate personally non-identifiable data relating to the individuals visible in the images or heard in the audio.

17. The one or more computer storage media of claim 16, having further computer-executable instructions that, upon execution by a processor, cause the processor to at least perform the anonymizing by generating, as the personally non-identifiable data, a count value indicative of a number of individuals in the monitoring data and further comprising deleting the monitoring data after performing the anonymizing.

18. The one or more computer storage media of claim 16, wherein the one or more individuals are monitored within a public space and having further computer-executable instructions that, upon execution by a processor, cause the processor to at least perform the anonymizing by generating, as the personally non-identifiable data, insight data to be aggregated to generate predictions regarding a future number of people in the public space.

19. The one or more computer storage media of claim 14, wherein the acquired data comprises monitoring data including at least one of images or audio of individuals, and having further computer-executable instructions that, upon execution by a processor, cause the processor to at least redact the monitoring data to remove the personally identifiable data by obscuring identifiable features of the individuals in the images or changing sound characteristics of voices of the individuals in the audio.

20. The one or more computer storage media of claim 14, wherein the personally identifiable data comprises images of faces of one or more individuals and having further computer-executable instructions that, upon execution by a processor, cause the processor to at least transmit the images with personally identifiable facial characteristics in the images of the one or more individuals removed to a cloud computing device to perform spatial analytics, including people counting.

* * * * *